US008078451B2

(12) United States Patent  
Dolan et al.

(10) Patent No.: US 8,078,451 B2
(45) Date of Patent: Dec. 13, 2011

(54) INTERFACE AND METHODS FOR COLLECTING ALIGNED EDITORIAL CORRECTIONS INTO A DATABASE

(75) Inventors: William B. Dolan, Kirkland, WA (US); Christopher John Brockett, Bellevue, WA (US); Michael Gamon, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1102 days.

(21) Appl. No.: 11/589,126

(22) Filed: Oct. 27, 2006

(65) Prior Publication Data

US 2008/0103759 A1 May 1, 2008

(51) Int. Cl.
| G06F 17/27 | (2006.01) |
| G06F 17/00 | (2006.01) |
| G06F 17/20 | (2006.01) |
| G06F 17/21 | (2006.01) |
| G06F 17/22 | (2006.01) |
| G06F 17/24 | (2006.01) |
| G06F 17/25 | (2006.01) |
| G06F 17/26 | (2006.01) |
| G06F 17/28 | (2006.01) |

(52) U.S. Cl. ............................. 704/9; 715/256; 715/257
(58) Field of Classification Search ...... 704/9; 715/256, 715/257
See application file for complete search history.

(56) References Cited

U.S. PATENT DOCUMENTS

| 5,384,702 | A | | 1/1995 | Tou .......................... 364/419.08 |
| 5,890,177 | A | * | 3/1999 | Moody et al. ................. 715/210 |
| 5,963,894 | A | * | 10/1999 | Richardson et al. .............. 704/9 |
| 6,062,388 | A | * | 5/2000 | Ohayon ........................ 206/509 |
| 6,092,034 | A | * | 7/2000 | McCarley et al. ................. 704/2 |
| 6,341,959 | B1 | * | 1/2002 | Wen et al. ..................... 434/169 |
| 6,363,342 | B2 | * | 3/2002 | Shaw et al. .................... 704/220 |
| 6,519,557 | B1 | * | 2/2003 | Emens et al. ..................... 704/8 |
| 6,714,905 | B1 | * | 3/2004 | Chang et al. ..................... 704/9 |
| 7,031,911 | B2 | * | 4/2006 | Zhou et al. ..................... 704/10 |

(Continued)

FOREIGN PATENT DOCUMENTS

WO   WO 01/33324   5/2001

OTHER PUBLICATIONS

Moshe Koppel, Jonathan Schler, Kfir Zigdon "Automatically Determining an Anonymous Author's Native Language", Intelligence and Security Informatics, vol. 3495/2005, 2005.*

(Continued)

*Primary Examiner* — Eric Yen
(74) *Attorney, Agent, or Firm* — Westman, Champlin & Kelly, P.A.

(57) ABSTRACT

A method for providing aligned editorial corrections to a database is discussed. The method includes receiving a first text in a language and organizing the first text into one or more sentences. The method further includes editing a copy of the first text to create a second text. The second text is in the language of the first text. The method further includes aligning the sentences of the first text with corresponding sentences of the second text storing the aligned sentences on a computer readable medium. A system for providing a data structure having aligned editorial corrections is also discussed. The system includes an alignment component for receiving a first text and organizing the first text into sentences. The system also includes a user interface configured to provide a second text, wherein the second text is an edited version of the first text in the language of the first text.

19 Claims, 10 Drawing Sheets

U.S. PATENT DOCUMENTS

| | | | |
|---|---|---|---|
| 7,047,493 B1* | 5/2006 | Brill et al. | 715/257 |
| 7,254,530 B2* | 8/2007 | Klavans et al. | 704/10 |
| 7,496,841 B2* | 2/2009 | Hadfield et al. | 715/255 |
| 7,620,550 B1* | 11/2009 | Gupta et al. | 704/257 |
| 2004/0002994 A1 | 1/2004 | Brill et al. | 707/104.1 |
| 2004/0006466 A1* | 1/2004 | Zhou et al. | 704/251 |
| 2004/0217944 A1* | 11/2004 | Kong | 345/173 |
| 2005/0102614 A1* | 5/2005 | Brockett et al. | 715/513 |
| 2005/0216253 A1 | 9/2005 | Brockett | 704/5 |
| 2006/0053001 A1 | 3/2006 | Brockett et al. | 704/9 |
| 2006/0074636 A1 | 4/2006 | Xu et al. | 704/10 |
| 2006/0136193 A1 | 6/2006 | Lux-Pogodalla et al. | 704/2 |
| 2006/0245641 A1* | 11/2006 | Viola et al. | 382/155 |
| 2007/0106494 A1* | 5/2007 | Detlef et al. | 704/9 |

OTHER PUBLICATIONS

Kukich, Karen, *Techniques for Automatically Correcting Words in Text*, ADM Computing Surveys, vol. 24, No. 4, Dec. 1992, pp. 377-439.

Nishida, Fujio, et al., *Feedback of Correcting Information in Postediting to a Machine Translation System*, Department of Electrical Engineering, University of Osaka Prefecture, pp. 476-481.

Kang, Mi-Young, et al., *Improving Partial Parsing Based on Error-Pattern Analysis for a Korean Grammar-Checker*, ACM Transactions on Asian Language Information Processing, vol. 2, No. 4, Dec. 2003, pp. 301-323.

* cited by examiner

INTERFACE AND METHODS FOR COLLECTING ALIGNED EDITORIAL CORRECTIONS INTO A DATABASE

BACKGROUND

Automated proofing tools for texts written by persons who are not native language speakers suffer from some problems. By native language, it is generally meant the language that is learned first by a particular individual, although, in some instances, that may not necessarily be the case. Increasingly, people around the world create texts in languages other than their native languages. Most notably, a number of people who aren't native English speakers create texts in English. These texts can be created in word processors, e-mail applications, or web page development software, to name a few examples. Despite the large and growing number of people who prepare such documents outside of their native language, useful editorial assistance in the form of proofing tools geared to their needs is surprisingly hard to obtain.

Proofing tools such as grammar checkers available in word processors and other text generation tools have been designed primarily with native language speakers in mind. However, such tools do not address the challenges of proofing texts written by persons that are not native language speakers. For example, a major difficulty associated with using native language centric proofing tools to proof text written by a non-native language speaker is that errors of grammar, lexical choice, idiomaticity, and style rarely occur in isolation. Instead, any given sentence produced by a non-native language writer may involve a complex combination of all these error types. Consider the following example, found on the World Wide Web and written by someone whose native language is Korean, which involves the misapplication of countability to a mass noun:

And I knew many informations about Christmas while I was preparing this article.

When proofing tools implemented to proof text written by native language writers are used to examine this text, they correctly (in the context of the examination of a native language writer's text) suggested that "much" should be substituted for "many" and "information" should be substituted for "informations". Despite these changes, the resultant sentence, "And I knew much information about Christmas while I was preparing this article", does not read as if it were written by an experienced, native language writer. Substituting the word "much" for "many" leaves the sentence stilted in a way that is probably undetectable to an inexperienced non-native speaker. In addition, the use of the word "knew" represents a lexical selection error that falls well outside the scope of conventional proofing tools. A better rewrite of the original sentence might be:

And I learned a lot of information about Christmas while I was preparing this article.

or, even more colloquially:

And I learned a lot about Christmas while I was preparing this article.

Repairing the error in the original sentence, then, is not a simple matter of fixing an agreement marker or substituting one determiner for another. Instead, wholesale replacement of the phrase "knew many informations" with the phrase "learned a lot" is needed to produce idiomatic-sounding output. It is difficult enough to design a proofing tool that can reliably correct individual errors; the simultaneous combination of multiple errors is beyond the capabilities of current proofing tools designed for native speakers.

Moreover, despite growing demand for proofing tools that address the needs of non-native language writers, there has been remarkably little progress in this area. Research into computer feedback for non-native language writers remains largely focused on smallscale pedagogical systems implemented within the framework of CALL (Computer Aided Language Learning). In addition, commercial grammar checkers for non-native language writers remain brittle and difficult to customize to meet the needs of non-native language writers of different native language backgrounds and skill levels.

Some researchers have begun to apply statistical techniques to identify learner errors in the context of essay evaluation to detect non-native text and to support lexical selection by non-native language writers through first-language translation. However, none of this work appears to directly address the more general problem of how to robustly provide feedback to non-native writers in a way that is easily tailored to different native language backgrounds and language skill levels in the non-native language in which they are writing.

The discussion above is merely provided for general background information and is not intended to be used as an aid in determining the scope of the claimed subject matter.

SUMMARY

In one illustrative embodiment a method for providing aligned editorial corrections to a database is discussed. The method includes receiving a first text and organizing the first text into one or more sentences. The method further includes editing a copy of the first text to create a second text. The second text is in the language of the first text. The method further includes aligning the sentences of the first text with corresponding sentences of the second text and storing the aligned sentences on a computer readable medium.

In another illustrative embodiment a method for training a proofing tool for providing automated proofing of textual document is discussed. The method includes receiving a first text in a language and creating a second text in the language of the first text. A data structure is created by aligning the first text with the second text. The data structure is then provided to the proofing tool.

In still another illustrative embodiment a system for providing a data structure having aligned editorial corrections stored on a computer readable medium is discussed. The system includes an alignment component configured to receive a first text and organize the first text into one or more sentences. The system further includes providing a second text, wherein the second text is an edited version of the first text in the language of the first text having one or more sentences. The data structure includes sentences of the first text in alignment with corresponding sentences of the second text.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

The present discussion refers to collecting and analyzing information to provide for proofing tools that are configured to correct or suggest corrections for grammar in text written by individuals such as non-native language writers or children who are just beginning to learn to read and write in their native language. The proofing tools can be used in conjunction with word processors, spreadsheets, e-mail clients or any other application that can utilize a grammar checking application.

For exemplary purposes in this discussion, the text to be corrected is written in English, although the systems and methods described herein are not limited in their application to the correction of English text, but can be applied to any language. In general, systematic patterns of errors made by non-native speakers (whose native language is another particular language for example, Spanish) are identified and those patterns are mapped to corresponding correct usage patterns in English. Alternatively, systematic patterns of errors made by children beginning to read or write are identified and those patterns of errors are mapped to corresponding correct usage patterns. For the purposes of brevity, embodiments discussed below refer to systems and methods for making editorial corrections for non-native speakers. However, it should be recognized that the embodiments discussed can be applied to, for example, children who are just learning to read and write in their native language.

Figure 1A:
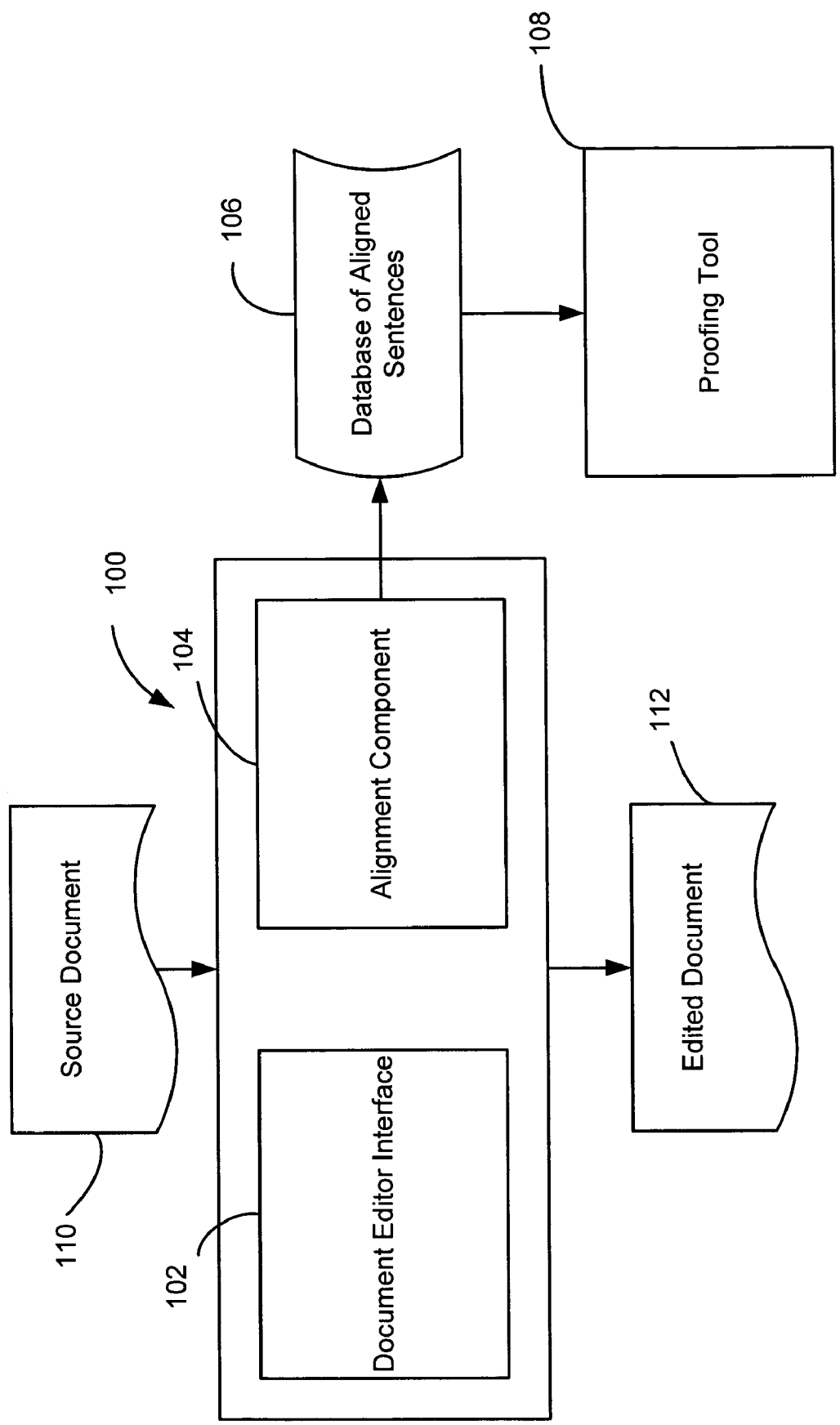
FIG. 1A is a block diagram of a system for creating a database of aligned editorial corrections in accordance with one illustrative embodiment.
Figure 1B:
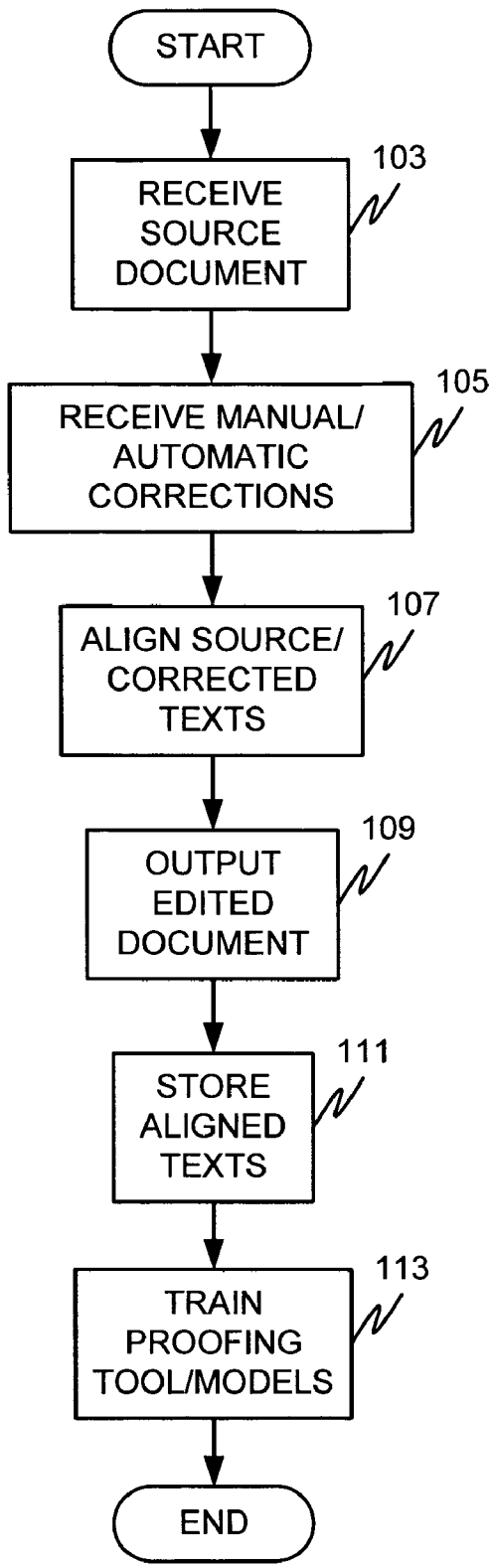
FIG. 1B is a flow diagram illustrating a method for creating a database of aligned editorial corrections in accordance with one illustrative embodiment.

FIG. 1A is a block diagram of a system 100 for creating a database of aligned editorial corrections in accordance with one illustrative embodiment. FIG. 1B provides a flow diagram of system for creating the database. System 100 is configured to receive a source document 110 that is, in one embodiment, an electronic representation of a text written in English by someone who is a non-native English language writer, which is represented in block 103. System 100 can receive the source document 110 as a e-mailed document, an attachment to an e-mailed document, a text message, a standalone application, or any other suitable means for receiving a text in electronic form.

System 100 includes a document editor user interface 102 allows a user to edit the textual source document 110, which is shown in block 105. User interface 102 is configured to be able to communicate with an alignment component 104. Alignment component 104 aligns the text in the source document 110 with a corresponding corrected text of the edited document 112, shown in block 107. The edited document 112 provided as an output, shown in block 109, in the form of an English document that has been corrected so that it is in a form that is familiar to those who speak and write English as their native language. The relationship between the user interface 102 and the alignment component 104 will be discussed below in various illustrative embodiments.

The aligned texts are stored in a database 106, shown in block 111. The database 106 of aligned sentences thus provides a training corpus, which includes both the source document text and the edited document text aligned together. The database of aligned sentences provides information regarding relationships between sentences written by non-native language speakers and corrected versions of the sentences. The database 106 of the aligned sentences is then provided to a proofing tool 108, as shown in block 111. The aligned sentences can be used by the proofing tool 108 as a basis for a statistical translation model, which can be used to correct text in applications such as a text editor. Thus, system 100 not only provides an editing tool to correct textual documents provided by non-native language speakers, it also provides a training corpus for use in other applications.

Figure 2:
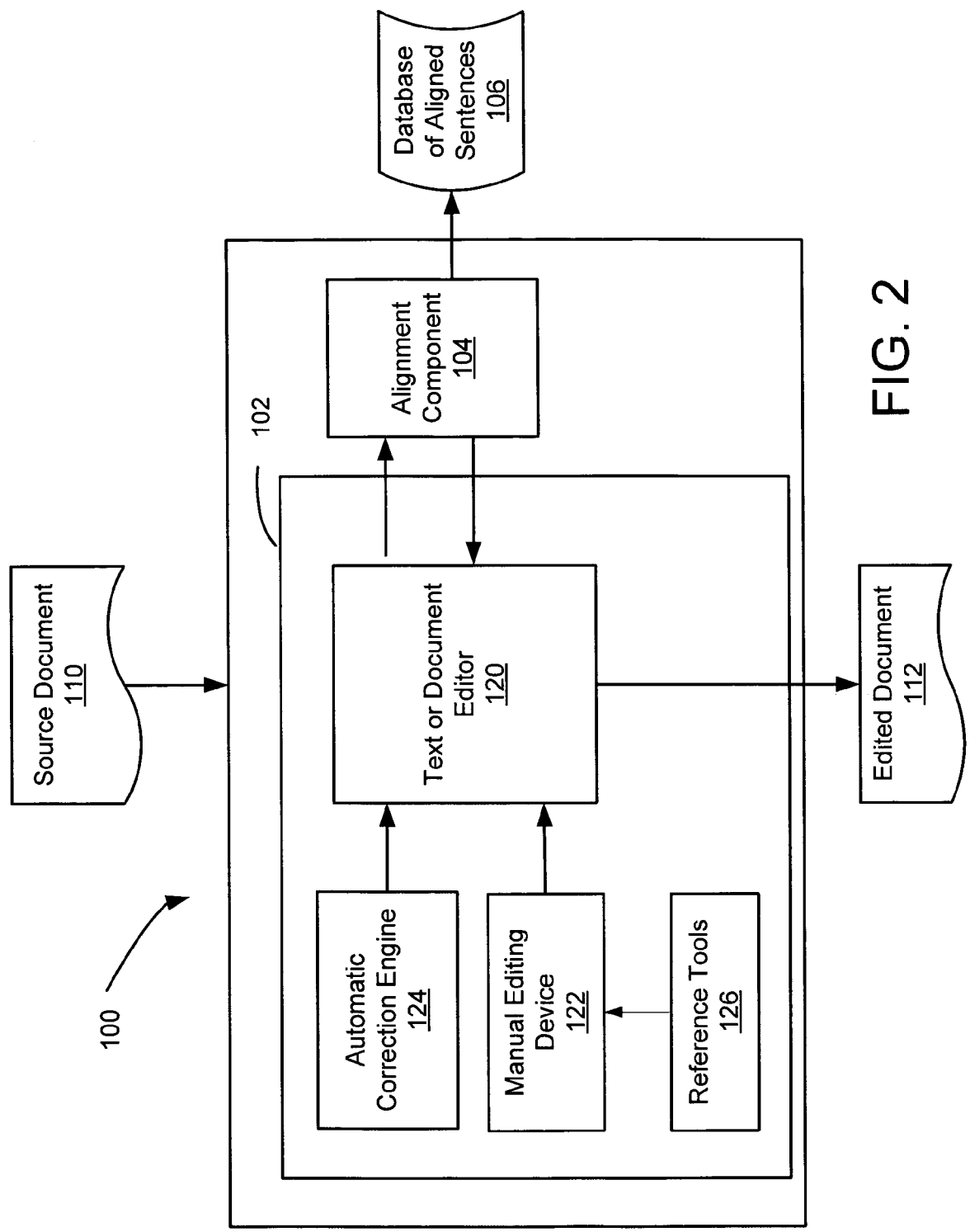
FIG. 2 is a more detailed block diagram of the system of FIG. 1, illustrating a user interface component in more detail.

FIG. 2 provides another view of system 100, showing the user interface 102 in more detail. User interface 102 includes a document editor 120. The document editor 120 receives the source document 110 and allows a human editor to edit the document. A manual editing device 122 allows the human editor to provide manual inputs to the document editor 120 that provide editorial correction to the source document 110. For example, the manual editing device 122 can include a keyboard and or a mouse, which allows the user to manipulate the textual input in the document editor 120. In one embodiment, the user interface 102 provides access to reference tools 126 to assist in the editing process. Reference tools 126 can include, without limitation, electronic dictionaries, thesauri and encyclopedias, grammar resources, and the ability to provide queries on the world wide web to assist the human editor in the editing process. In addition, the user interface 102 may allow the human editor to access monolingual and bilingual dictionaries in the native language of the non-native speaking author.

In one illustrative embodiment, the user interface 102 can include an automatic correction engine 124, which can suggest potential corrections that might be made in the source document. For example, when the automatic correction engine 124 detects a potential problem, it can flag text such as by providing a wavy underline beneath the text to alert the editor of a potential grammatical problem. Alternatively, the automatic correction engine 124 automatically makes changes to the document. The automatic correction engine 124 may utilize tools such as cached information containing contextual memory of previously made, high frequency corrections. That is, previous usage of the system 100 that resulted in collecting aligned data may be looped back into the user interface through the automatic correction engine 124 to assist in the error correction task. In addition, the automatic correction engine 124 may utilize the World Wide Web, or information stored on a server on a local area network or on local machines, or in various combinations thereof to provide tools for automatic correction. Alternatively, the user interface 102 need not include the automatic correction engine 124.

The document editor 120 illustratively includes one or more panes or windows in which text is displayed for correction by the human editor. In one embodiment, a first pane is provided that displays the unedited source text 110. A second pane is also provided in which the source test is able to be edited. The human editor can make modifications to the text in the second pane including, for example, cutting and pasting strings of letters or words or typing modifications.

Figure 3:
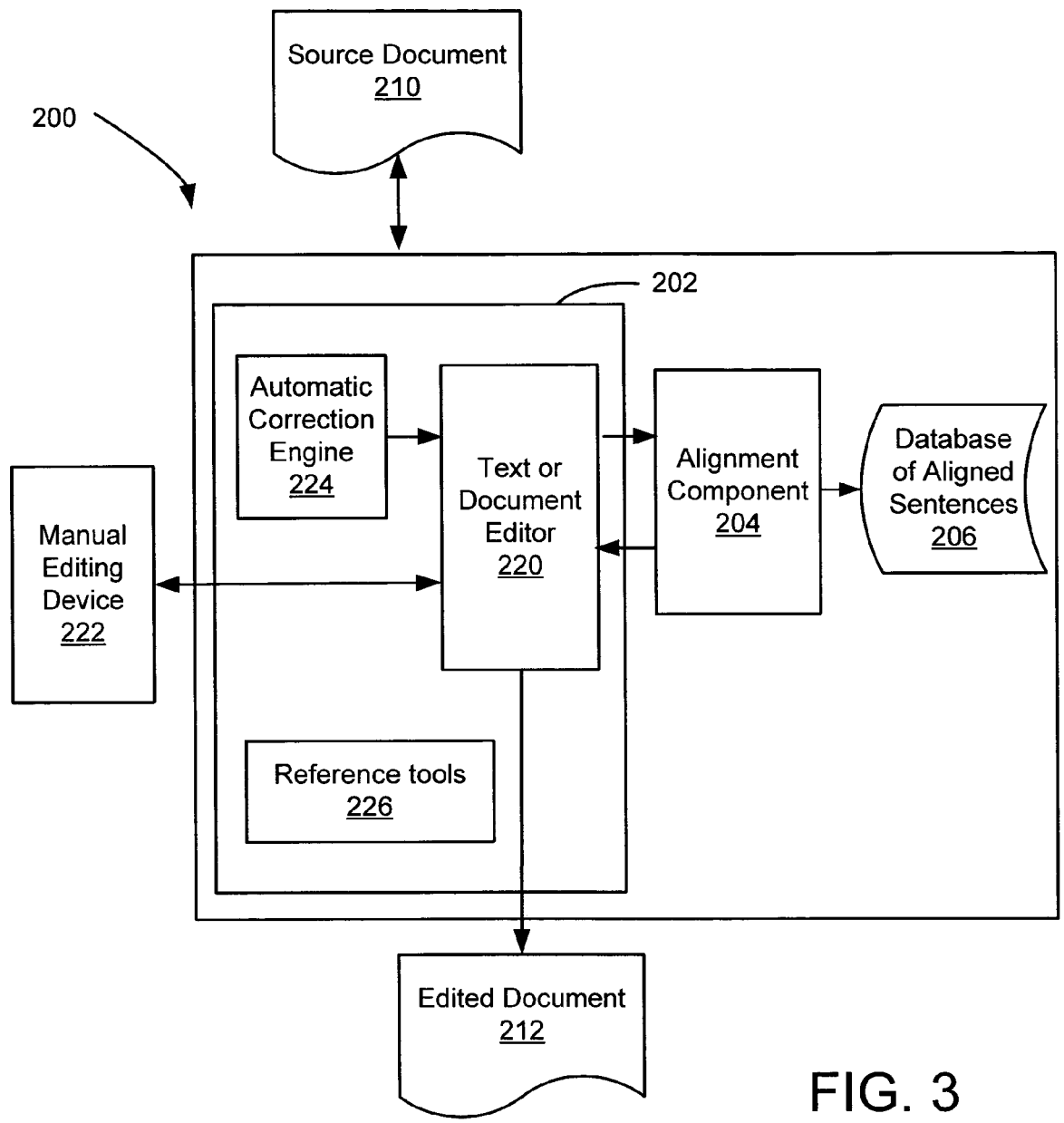
FIG. 3 is a block diagram of a system for creating a database of aligned editorial corrections by accessing a remotely located application through a web-based or other server interface according to one illustrative embodiment.

FIG. 3 illustrates system 200 for creating a database of aligned editorial corrections in accordance with another illustrative embodiment. System 200 is stored on a remote server. A non-native language author's input 210 is transmitted to system 200. System 200 includes a user interface 202 and an alignment component 204, which interact with each other to pass information back and forth regarding the original information provided by the author and corrections made thereto. Details regarding the relationship between the user interface 202 and the alignment component 204 will be provided in more detail below. System 200 optionally includes an automatic correction engine 224, which can provide suggestions for corrections to be made and/or make automatic corrections to the author's text.

Manual editing device 222 accesses the system 200 to provide access for a human editor via a remote server. The human editor can make corrections to the author's input by accessing the data processing applications user interface 202. The user interface 202 illustratively includes a document editor similar to the document editor 120 described above. In one embodiment, the system 200 provides access to reference tools 226 to assist in the editing process. Once the document has been edited, an edited copy of the document is returned to the author. In addition, a database 206 of aligned sentences is stored in the system 200. The aligned sentences in database 206 reflect an alignment of the original document 210 provided by the author and the edited document 222 as edited by the human editor. The database can be stored in any acceptable format such as, for example, html, asci, rich text format, and the like. The database of aligned sentences 206 are illustratively then provided to a proofing tool such as the proofing tool 108 discussed above.

Figure 4:
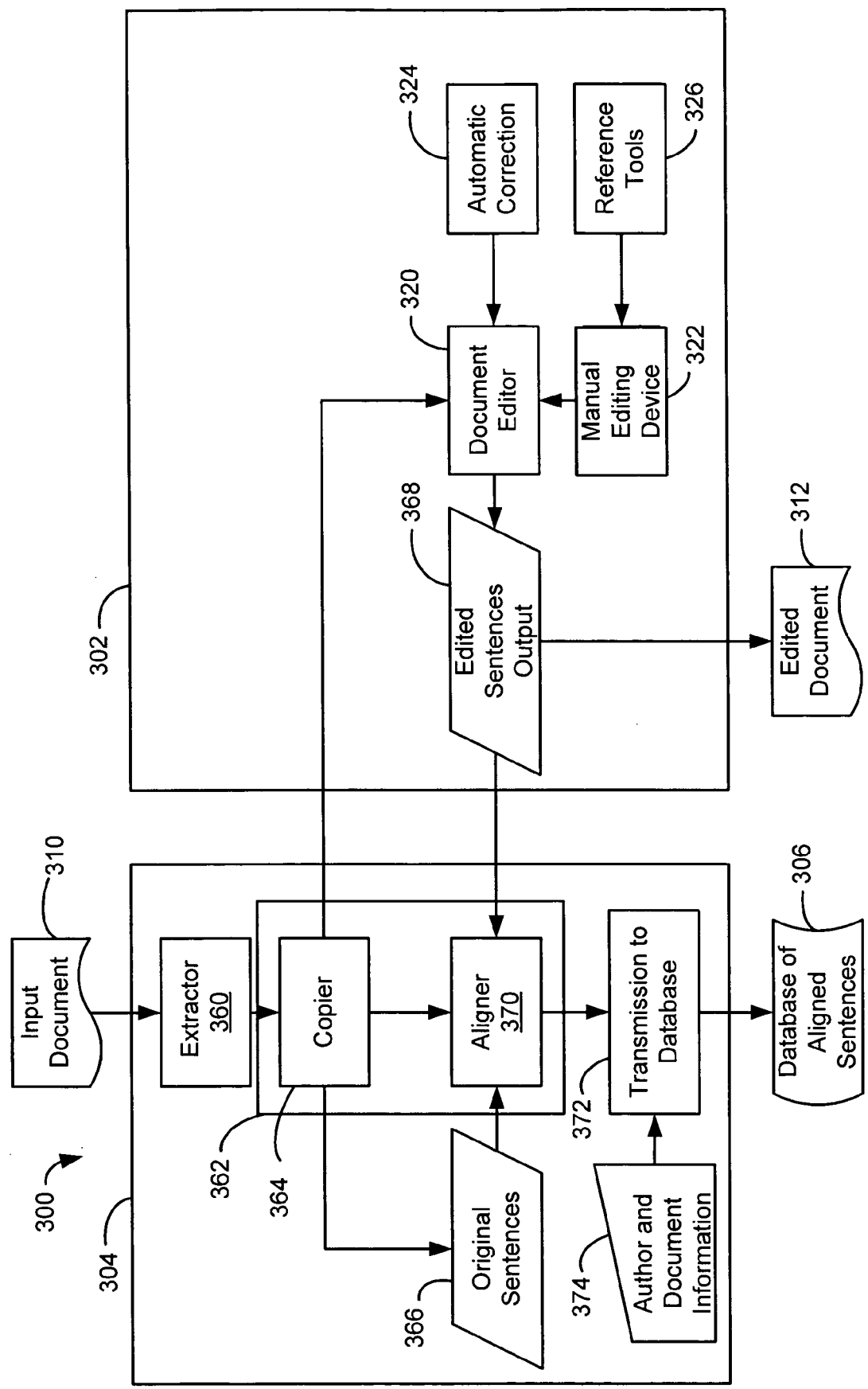
FIG. 4 is a block diagram illustrating the detail of alignment and editorial components of a system of the type shown in FIG. 1A according to one exemplary embodiment.

FIG. 4 illustrates the relationship between a system 300 for creating a database of aligned editorial corrections for text written by non-native language writers having a document editor user interface 302 and an alignment component 304 according to one illustrative embodiment. The illustrative embodiment shown herein can be implemented in systems that are stored locally or accessed remotely as discussed above.

System 300 receives a source document 310, which is an electronic representation of a text written in English by someone who is a non-native language writer. Source document 310 is provided to a sentence extractor 360 located in the alignment component 304. Sentence extractor 360 divides the source document into a series of sentences. The source document 310, now broken into sentences, is passed to a core aligner component 362. The core aligner 362 includes a copier 364, which makes a copy of the sentences and coindexes the copy with the original sentences and an aligner 370, which aligns the sentences after they have been edited.

The original sentences of the source document 310 are held in memory 366 of the alignment component 304 to await processing. The copy of the sentences is provided to the user interface 302 for processing. The copied sentences are loaded into document editor 320, which illustratively is similar to the document editor 120 discussed above, receive editorial input from a human editor through a manual editing device 322 and optionally from an automatic correction engine 324 and are converted into edited sentences 368. As discussed above, reference tools 326 may optionally be available for the human editor. The edited sentences are provided back to the author in the form of an edited document 312. Alternatively, the edited document 312 is not returned to the author.

In addition, the edited sentences 368 are provided, along with the original sentences 366 to aligner 370, which aligns the sentences after the editing process. During the editing process, significant editorial restructuring of sentence alignments may occur. For example, one sentence may be restructured into multiple (or "many") sentences. Conversely, many sentences may be combined into a single sentence. Additionally, many sentences may be rearranged into a many sentence arrangement without a one-to-one correlation. Accordingly, the aligner 370 updates the indexation with the original sentences or restructures the sentence data when required by such changes.

Once the original and edited sentences are aligned, they are prepared at block 372 for transmission to a database of aligned sentences 306. In one embodiment, data corresponding to the author of the original sentences is attached to the aligned sentences as is shown in block 374. Such data may include, for example, the age, educational level, native language, and occupation of the author. Such information can be used to identify different patterns based upon recognition of an author's skill level. In addition, information about the document that was edited can be provided. For example, the domain, style, type of document or any other information that might be helpful in constructing models for automated error correction. Alternatively, similar information may be provided about the human editor. As it may be desirable to have several different persons edit source text, identification of persons who edit the text can provide valuable data about the quality of the edits that were made in any given document. The database of aligned sentences 306 is then illustratively provided to a proofing tool similar to that of proofing tool 108 discussed above.

Figure 5:
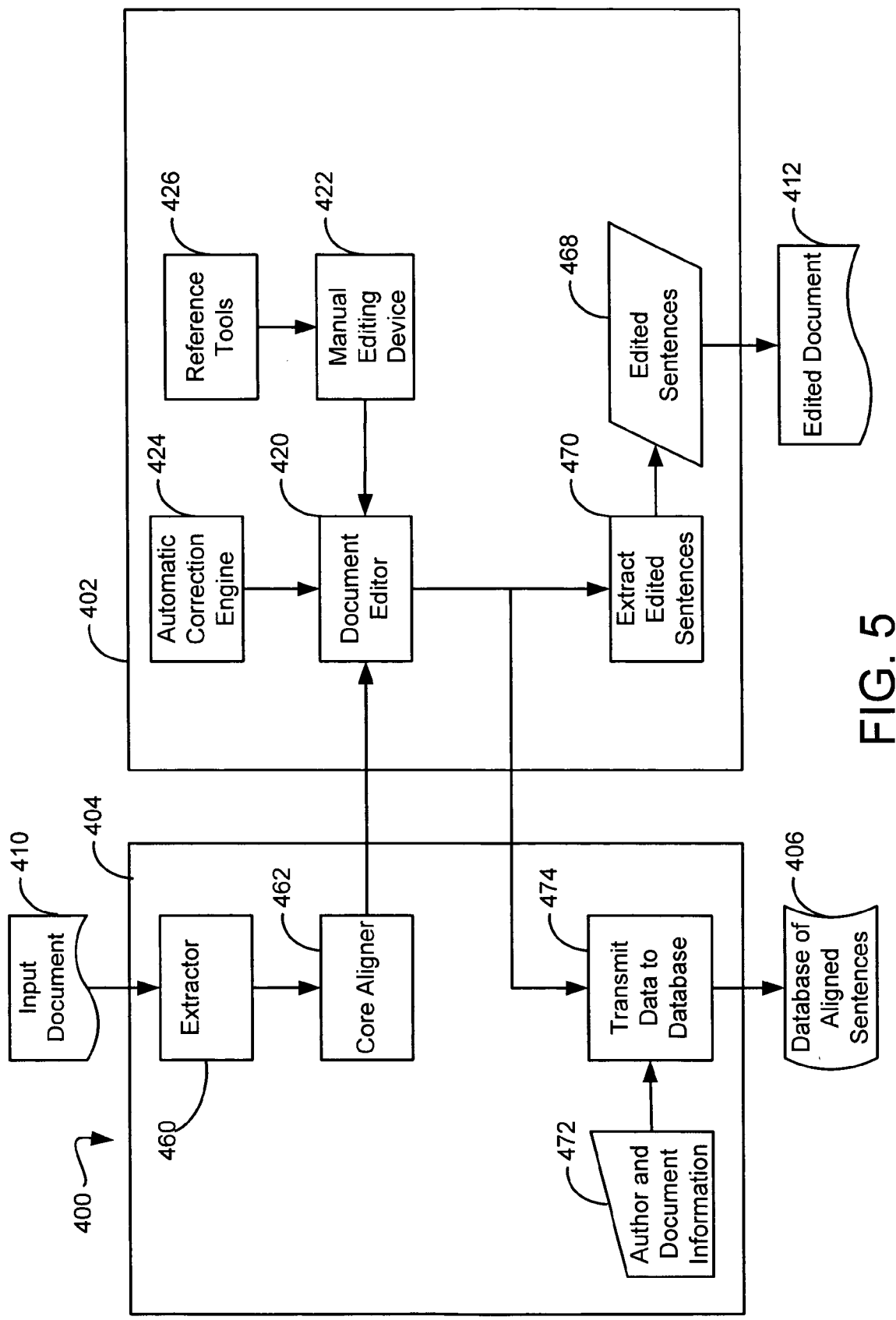
FIG. 5 is a block diagram illustrating the detail of alignment and editorial components of a system of the type shown in FIG. 1A according to another exemplary embodiment.

FIG. 5 illustrates the relationship between a system 400 for creating a database of aligned editorial corrections for text written by non-native language writers having a document editor user interface 402 and an alignment component 404 according to another illustrative embodiment. The illustrative embodiment shown in FIG. 5 can be implemented in systems that are stored locally or accessed remotely as discussed above.

Figure 6:
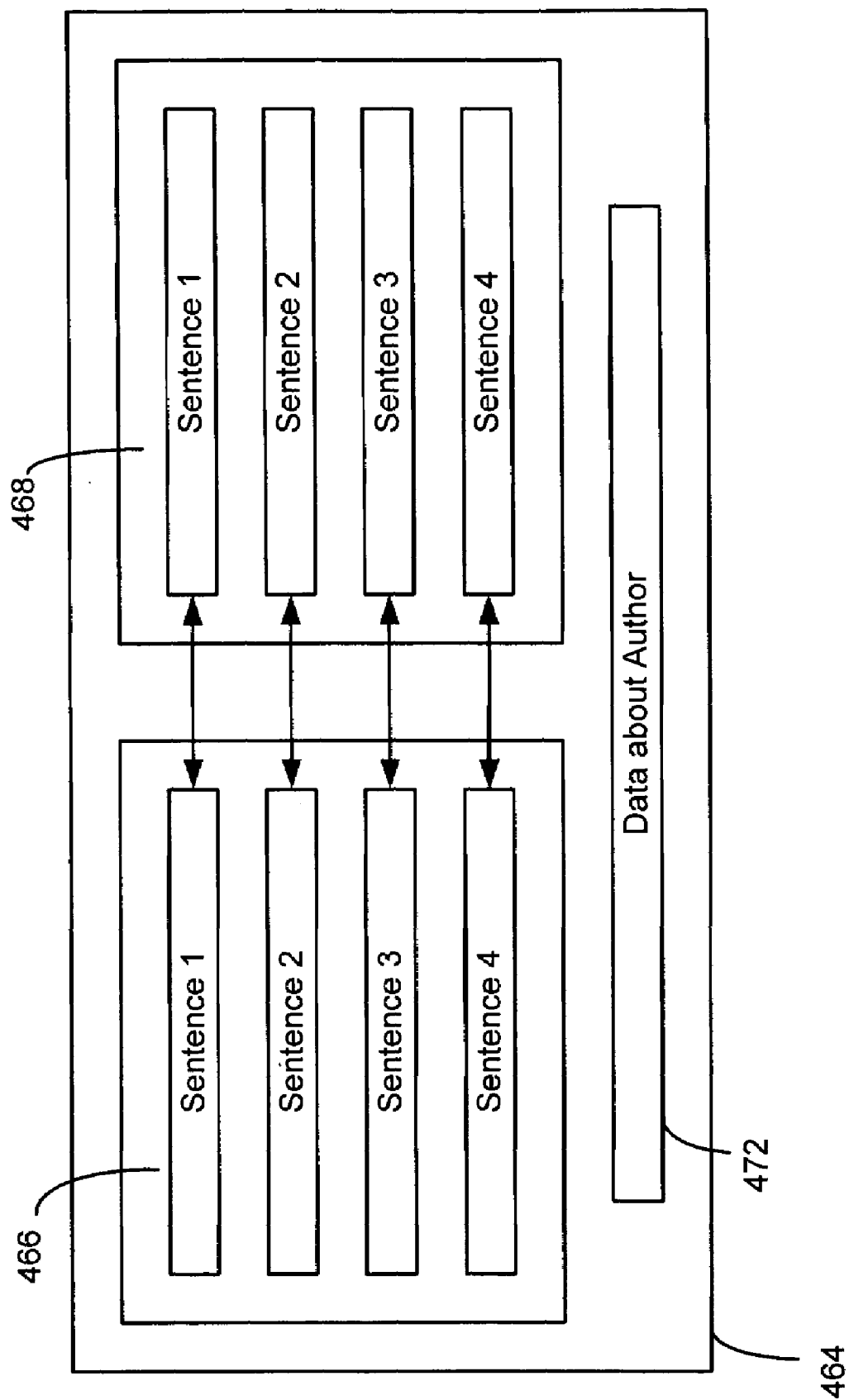
FIG. 6 is a diagram illustrating a data structure created by the system of FIG. 5.

System 400 receives a source document 410, which is an electronic representation of a text written in English by someone who is a non-native language writer. Source document 410 is provided to a sentence extractor 460 located in the alignment component 404. Sentence extractor 460 divides the source document into a series of sentences. The source document 410, now broken into sentences, is passed to a core aligner component 462. The core aligner 462 creates a data structure 464 (as shown in FIG. 6) including both the original sentences 466 and copies of the original sentences 468. The data structure 464 is passed to the user interface 402, where the copied sentences 468 are loaded into the document editor 420, edited by a human editor through a manual editing device 422, and optionally via an automatic correction engine 424. As in other previously discussed embodiments, reference tools 426 are provided for the human editor.

Once the copied sentences 468 have been edited, the copied sentences 468, as edited, are stripped from the data structure, as shown at block 470 and provided back to the author in the form of an edited document 412. The entire data structure 464, including both the original 466 and copied 468 sentences, are also returned to the alignment component 404. Data about the author 472 is optionally attached to the data structure 464, before it is transferred, as represented at block 474, to a database of aligned sentences 406. Alternatively, or in addition, similar information may be provided about the human editor. The database of aligned sentences 406 is then illustratively provided to a proofing tool similar to that of proofing tool 108 discussed above.

Figure 7:
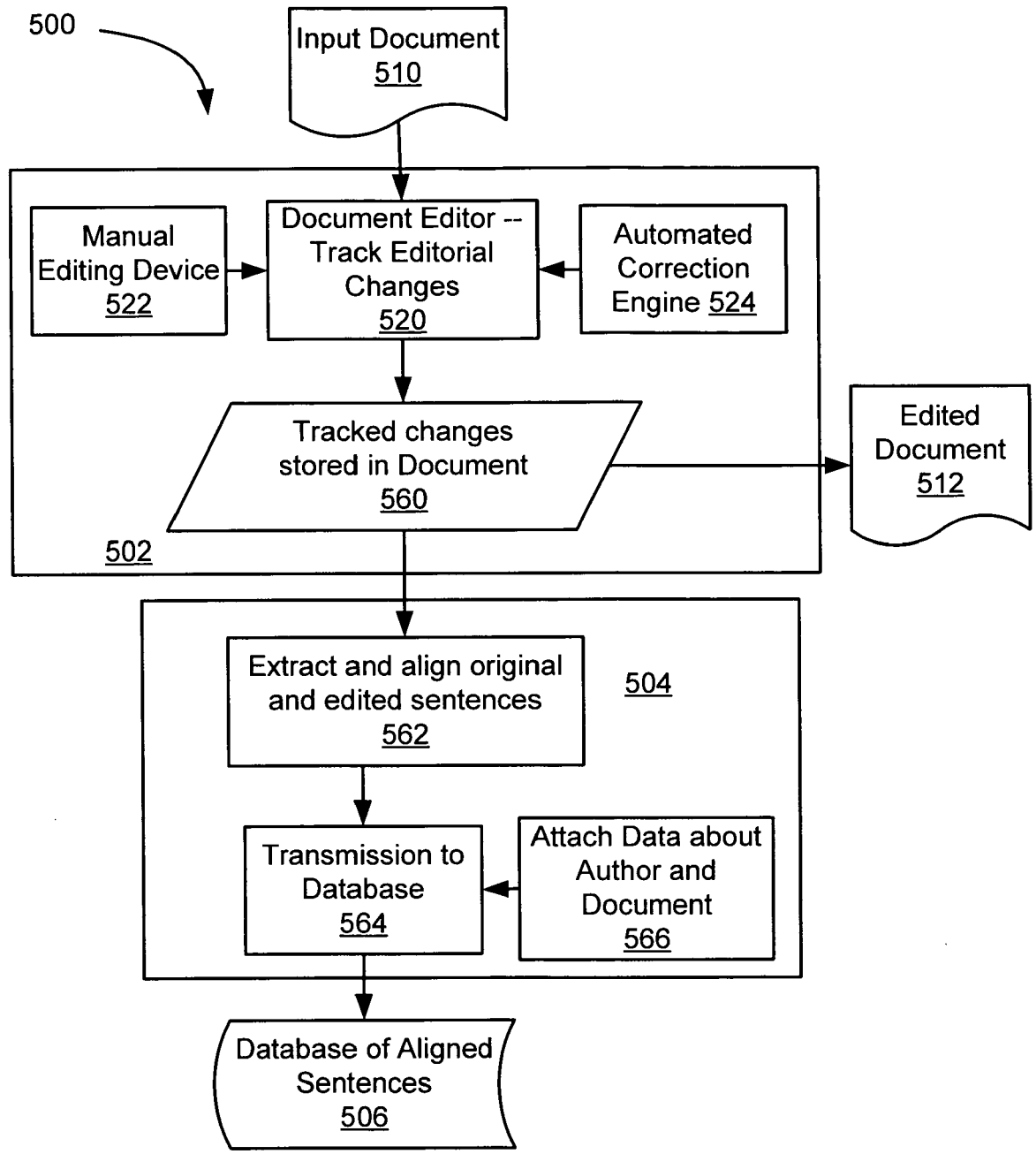
FIG. 7 is a block diagram illustrating an exemplary embodiment that utilizes a track changes feature to provide an aligned data structure having a source text and an edited version of the source text.

FIG. 7 illustrates the relationship between a system 500 for creating a database of aligned editorial corrections for text written by non-native language writers having a document editor user interface 502 and an alignment component 504 according to another illustrative embodiment. System 500 receives a source document 510, which is an electronic representation of a text written by someone who is a non-native language writer. The source document 510 is provided to a user interface 502 and is loaded into a document editor 520. Document editor 520 allows a human editor to make editorial correction through manual editing device 522, and optionally allows for automatic correction via an automatic correction engine 524. Document editor 520 includes a "track changes" feature, which signals any changes made in a document. A track changes feature, in a word processor, for instance, illustrates all changes made to a document, including additions and deletions thereto.

Once the document has been edited, the track changes are stored in the document 510, as is shown at block 560. The document 510 can then be exported to the author as an edited document 512. By accepting all of the tracked changes, the edited document 512 illustrates an edited text without providing the inconvenience of having to decipher the text.

In addition, the now edited document 510 is exported to an alignment component 504. The alignment component extracts and aligns the original and edited sentences from the edited document by deciphering the edits illustrated by the track changes feature as is shown at block 562. The aligned sentences are prepared to be transmitted at block 564. Optionally, data 566 about the author and/or the editor of the document can be attached to the aligned sentences. The aligned sentences are then transmitted to a database of aligned sentences 506, where they can be utilized by a proofing tool such at the proofing tool 108 discussed above.

Figure 8:
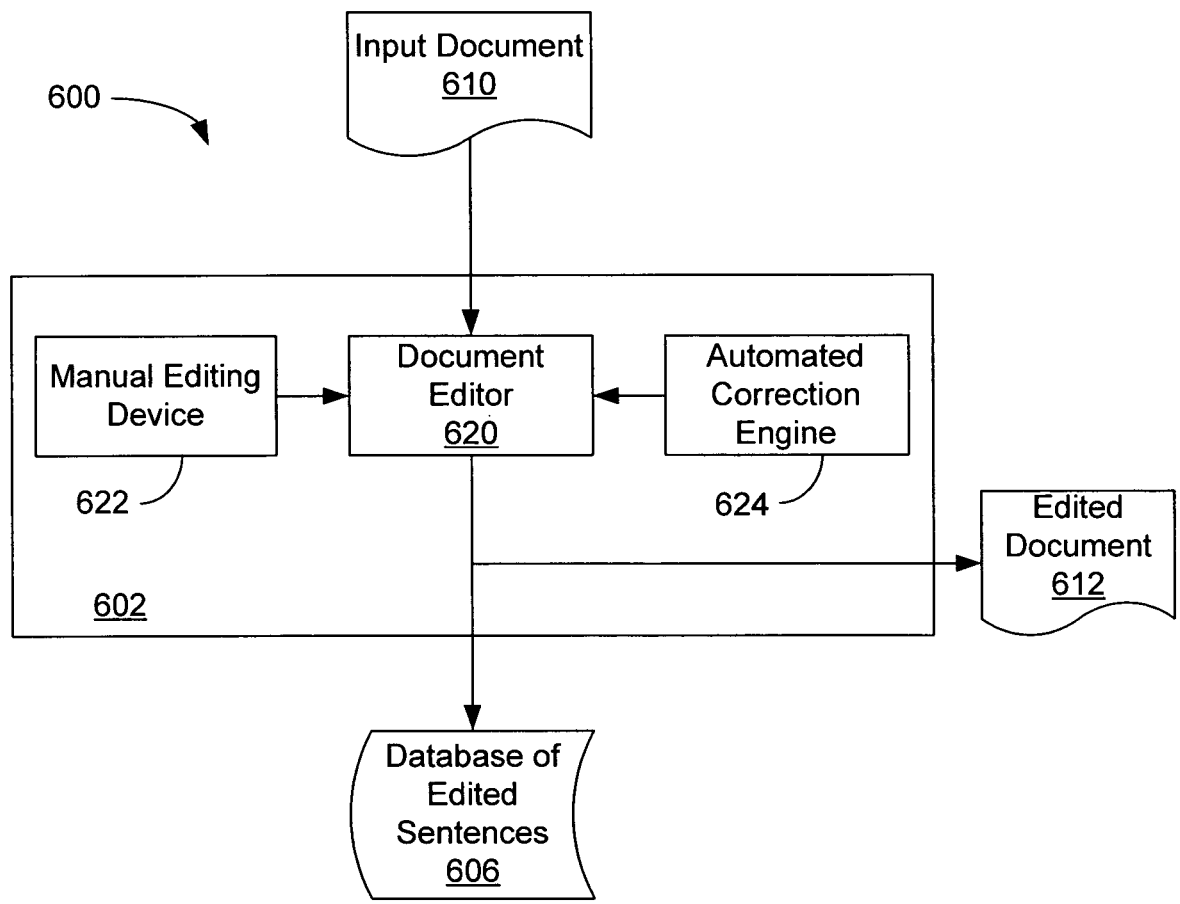
FIG. 8 is a block diagram illustrating an exemplary embodiment that provides a single file that stores a data structure including an original document and identified editorial changes.
Figure 9:
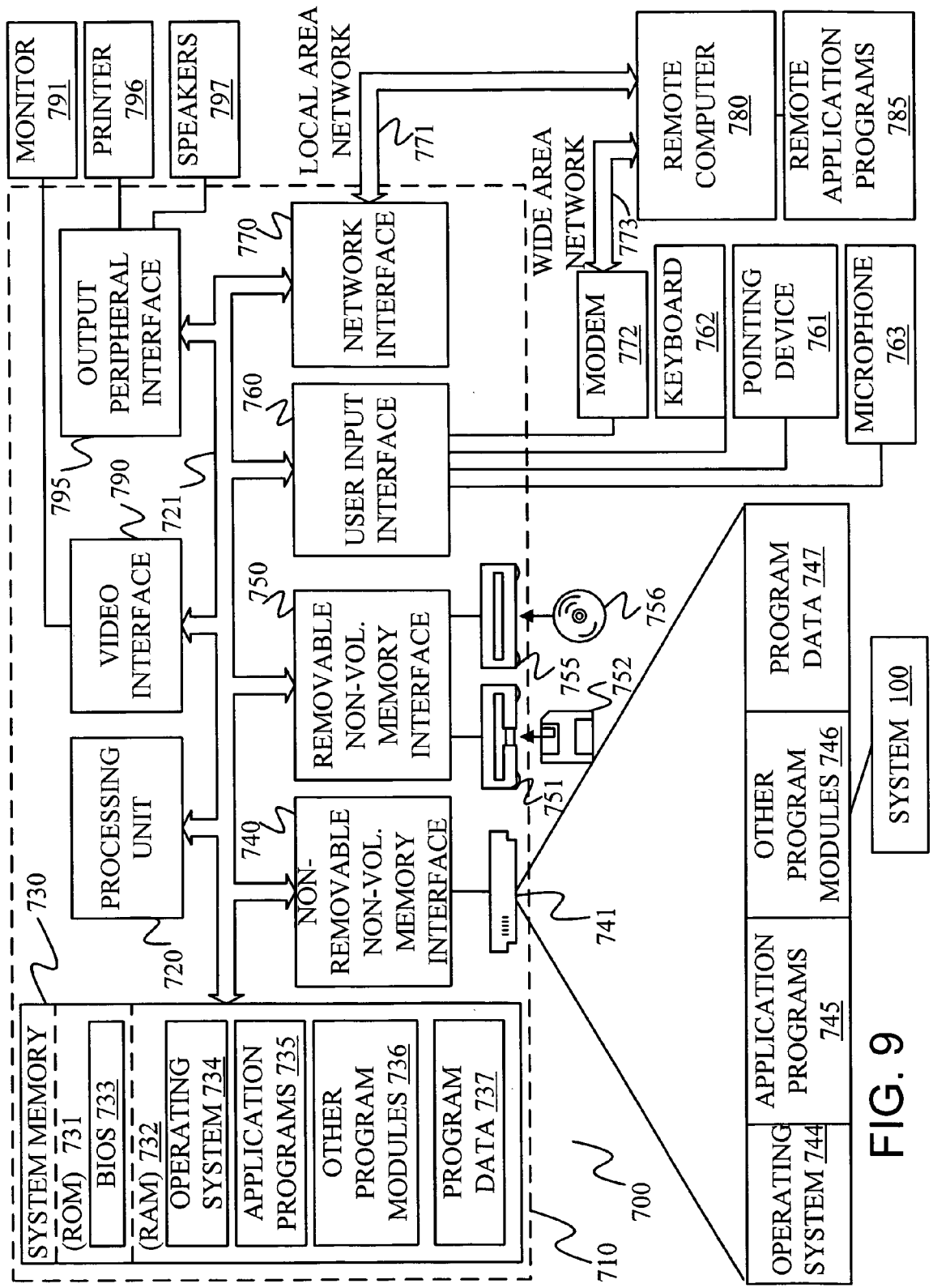
FIG. 9 is a block diagram of one computing environment in which some embodiments may be practiced.

FIG. 8 illustrates the relationship between a system 600 for creating a database of editorial corrections for text written by non-native language writers having a document editor user interface 602 according to yet another illustrative embodiment. System 600 includes a document editor user interface 602 configured to receive an input document 610 written by a non-native language writer. A document editor 620 is provided to display the input document 610, similar to the document editor described above. The document editor 620 illustratively includes one or more panes or windows in which text is displayed for correction by the human editor. In one embodiment, a first pane is provided that displays the unedited input document 610. A second pane is also provided in which the source test is able to be edited. Alternatively, the document editor 620 can have a single pane configured to display the input document and any changes made to it. The changes can be highlighted to visually identify any changes made to the input document 610, although the document editor need not highlight changes. Changes to the input document can be made either through manual editing device 622, which can have access to reference tools 626 or through automated error correction device 624. The manual editing device 622 and error correction device 624 can be similar to those discussed above in conjunction with other embodiments.

Once the input document 610 has been edited with the document editor 620, an edited document 612 can be provided to the author. In addition, the edited document is illustratively provided to a database of edited sentences 606, which in turn can be provided to a proofing tool 609. Unlike in previous embodiments, where a set of original sentences are aligned with corrected sentences, the database of edited sentences 609 includes a single set of sentences that include information relative to both the original sentences and edits made thereto. In one illustrative embodiment, the edited sentences incorporate a character offset protocol in meta data to indicate the location of any additions or deletions to an original sentence. The edited sentences located in database 609 can be stored in any suitable format, including, for example, XML.

As in other embodiments, the database of aligned sentences 609 is illustratively provided to a proofing tool. Because the database of aligned sentences 609 of the illustrative embodiment has only one set of sentences as opposed to an aligned set of sentences, it may be necessary to provide a mechanism to read the database of edited sentences 609, convert them to a pair of sentences, including an original set of sentences and an edited set and provide alignment between the original and edited set. The newly created set of aligned sentences can then be provided to the proofing tool. Alternatively, the proofing tool can be configured to accept the database of edited sentences 609, and convert the edited sentences into an aligned set of sentences.

FIG. 10 illustrates an example of a suitable computing system environment 700 on which embodiments such as system 100 described above may be implemented. The computing system environment 700 is only one example of a suitable computing environment and is not intended to suggest any limitation as to the scope of use or functionality of the claimed subject matter. Neither should the computing environment 700 be interpreted as having any dependency or requirement relating to any one or combination of components illustrated in the exemplary operating environment 700.

Embodiments are operational with numerous other general purpose or special purpose computing system environments or configurations. Examples of well-known computing systems, environments, and/or configurations that may be suitable for use with various embodiments include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

Embodiments may be described in the general context of computer-executable instructions, such as program modules, being executed by a computer. Generally, program modules include routines, programs, objects, components, data structures, etc. that perform particular tasks or implement particular abstract data types. Some embodiments are designed to be practiced in distributed computing environments where tasks are performed by remote processing devices that are linked through a communications network. In a distributed computing environment, program modules are located in both local and remote computer storage media including memory storage devices.

With reference to FIG. 10, an exemplary system for implementing some embodiments discussed herein includes a general-purpose computing device in the form of a computer 710.

Components of computer 710 may include, but are not limited to, a processing unit 720, a system memory 730, and a system bus 721 that couples various system components including the system memory to the processing unit 720. The system bus 721 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 710 typically includes a variety of computer readable media. Computer readable media can be any available media that can be accessed by computer 710 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data such as those associated with system 100 described above. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 710. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 730 includes computer storage media in the form of volatile and/or nonvolatile memory such as read only memory (ROM) 731 and random access memory (RAM) 732. A basic input/output system 733 (BIOS), containing the basic routines that help to transfer information between elements within computer 710, such as during start-up, is typically stored in ROM 731. RAM 732 typically contains data and/or program modules that are immediately accessible to and/or presently being operated on by processing unit 720. By way of example, and not limitation, FIG. 10 illustrates operating system 734, application programs 735, other program modules 736, and program data 737.

The computer 710 may also include other removable/non-removable volatile/nonvolatile computer storage media. By way of example only, FIG. 10 illustrates a hard disk drive 741 that reads from or writes to non-removable, nonvolatile magnetic media, a magnetic disk drive 751 that reads from or writes to a removable, nonvolatile magnetic disk 752, and an optical disk drive 755 that reads from or writes to a removable, nonvolatile optical disk 756 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 741 is typically connected to the system bus 721 through a non-removable memory interface such as interface 740, and magnetic disk drive 751 and optical disk drive 755 are typically connected to the system bus 721 by a removable memory interface, such as interface 750.

The drives and their associated computer storage media discussed above and illustrated in FIG. 10, provide storage of computer readable instructions, data structures, program modules and other data for the computer 710. In FIG. 10, for example, hard disk drive 741 is illustrated as storing operating system 744, application programs 745, other program modules 746 such as those associated with system 100, and program data 747. Note that these components can either be the same as or different from operating system 734, application programs 735, other program modules 736, and program data 737. Operating system 744, application programs 745, other program modules 746, and program data 747 are given different numbers here to illustrate that, at a minimum, they are different copies. An example of a program module 746 is a program including system 100, which is discussed herein.

A user may enter commands and information into the computer 710 through input devices such as a keyboard 762, a microphone 763, and a pointing device 761, such as a mouse, trackball or touch pad. Other input devices (not shown) may include a joystick, game pad, satellite dish, scanner, or the like. These and other input devices are often connected to the processing unit 720 through a user input interface 760 that is coupled to the system bus, but may be connected by other interface and bus structures, such as a parallel port, game port or a universal serial bus (USB). Devices such as the ones described here provide a way for human editors to input data required for editing text such as source document 110.

A monitor 791 or other type of display device is also connected to the system bus 721 via an interface, such as a video interface 790. In the embodiments disclosed above, a document editor such as document editor user interface 102 provides visual data for the human editor to read in order to make edits. In addition to the monitor, computers may also include other peripheral output devices such as speakers 797 and printer 796, which may be connected through an output peripheral interface 795.

The computer 710 is operated in a networked environment using logical connections to one or more remote computers, such as a remote computer 780. The remote computer 780 may be a personal computer, a hand-held device, a server, a router, a network PC, a peer device or other common network node, and typically includes many or all of the elements described above relative to the computer 710. The logical connections depicted in FIG. 10 include a local area network (LAN) 771 and a wide area network (WAN) 773, but may also include other networks. Such networking environments are commonplace in offices, enterprise-wide computer networks, intranets and the Internet.

When used in a LAN networking environment, the computer 710 is connected to the LAN 771 through a network interface or adapter 770. When used in a WAN networking environment, the computer 710 typically includes a modem 772 or other means for establishing communications over the WAN 773, such as the Internet. As described above, source documents 110 may be received via a variety of different methods of transferring electronic data, including through the use of e-mail, which can be transmitted over a WAN. The modem 772, which may be internal or external, may be connected to the system bus 721 via the user input interface 760, or other appropriate mechanism. In a networked environment, program modules depicted relative to the computer 710, or portions thereof, may be stored in the remote memory storage device. By way of example, and not limitation, FIG. 10 illustrates remote application programs 785 as residing on remote computer 780. It will be appreciated that the network connections shown are exemplary and other means of establishing a communications link between the computers may be used.

It is to be understood that while this document describes the implementation based on editing English language text written by non-native writers of English, the use of English as the language in the foregoing embodiments is for illustrative purposes only and is not intended to be limiting in any way. Thus, the disclosure can be directed toward correcting the written word by non-native writers of any language.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method for providing aligned editorial corrections to a database, comprising:
   receiving a first text in a language;
   dividing the first text into a series of sentences;
   making a copy of each sentence in the series of sentences;
   indexing the copies of the sentences with the corresponding original sentences in the series of sentences;
   utilizing a computer processor that is a component of a computer to edit the copies of the sentences to create a second text, wherein the second text is in the language of the first text;
   utilizing the indexing to align each sentence in the series of sentences with its corresponding edited copy; and
   storing the aligned sentences in the series of sentences and the edited copies on a computer readable medium.

2. The method of claim 1, wherein editing the copies of the sentences includes providing automated editorial input.

3. The method of claim 1, wherein editing the copies of the sentences includes providing a user interface that displays the copies of the sentences to a human editor and provides an input device to receive input from the editor.

4. The method of claim 3, wherein the step of providing a user interface includes providing editorial reference tools to the editor through the user interface.

5. The method of claim 3, wherein the step of providing the user interface includes providing an indication of suggested editorial corrections to the editor.

6. The method of claim 1, wherein utilizing the indexing to align each sentence in the series of sentences with its corresponding edited copy includes aligning one sentence with more than one sentence.

7. A computer-implemented method for training a proofing tool for providing automated proofing of textual document, comprising:
   receiving a first text in a language;
   receiving editorial corrections to be made to the first text;
   utilizing a computer processor that is a component of a computer to create a data structure that provides information indicative of the first text and the editorial corrections;
   attaching author information about an author of the first text to the data structure, the author information identifying a native language of the author, the native language of the author being a language other than the language of the first text; and
   providing the data structure to the proofing tool.

8. The method of claim 7, wherein the step of creating a data structure comprises:
   creating a second text, wherein the second text includes the first text with the editorial corrections made thereto; and
   aligning the first text with the second text.

9. The method of claim 7, wherein the author information includes information indicative of an educational level of the author.

10. The method of claim 7, further comprising the step of attaching information about an author of the editorial corrections to the data structure.

11. The method of claim 7, wherein the step of creating a data structure includes creating a copy of the first text and providing editorial modifications to the copy.

12. The method of claim 11, wherein the step of providing editorial modifications to the copy includes providing a user interface that displays the copy and receives editorial input from an editor.

13. The method of claim 11, wherein the step of providing the user interface includes providing access to editorial reference tools through the user interface.

14. A computer-implemented method of claim 7, wherein the author information is attached to the data structure after receiving the first text and after receiving the editorial corrections.

15. A computer-implemented method of claim 7, wherein the author information attached to the data structure comprises information apart from the first text.

16. A system for providing a data structure having aligned editorial corrections stored on a computer readable medium, comprising:
   an alignment component configured to receive a first text in a language and organize the first text into a series of sentences; and
   a user interface configured to provide a second text comprising an edited version of the first text in the language of the first text, the second text being provided to the alignment component which generates a data structure including sentences of the first text in alignment with corresponding sentences of the second text,
   wherein the user interface is configured to provide automated editorial modifications for one or more sentences of the first text utilizing previously aligned data, which provides one or more corresponding edited sentences in the second text that are aligned with one or more sentences of the first text by the alignment component, the previously collected aligned data including original text aligned with editorial corrections of the original text, that is looped back into the user interface through an automatic correction engine.

17. The system of claim 16, wherein the first text includes text created by a non-native language writer and wherein the data structure includes information about the writer.

18. The system of claim 16, wherein the user interface is configured to receive editorial corrections from an editor and wherein the data structure includes information about the editor.

19. The system of claim 16, wherein one sentence of one of the first and second texts is aligned with more than one sentence of the other of the first and second texts.

* * * * *